United States Patent
Hynes

(10) Patent No.: US 6,531,979 B1
(45) Date of Patent: Mar. 11, 2003

(54) ADAPTIVE TIME-COMPRESSION STABILIZER

(75) Inventor: Robert Hynes, Oxon Hill, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 05/014,828

(22) Filed: Feb. 10, 1970

(51) Int. Cl.[7] ............................................... G01S 7/292
(52) U.S. Cl. ........................ 342/90; 342/192; 342/193
(58) Field of Search ........................... 343/5 DP, 5 SA, 343/17.2 PC; 307/221, 271, 295; 328/134; 342/90, 192, 193, 194, 195, 196, 45

(56) References Cited

U.S. PATENT DOCUMENTS

| 3,030,582 | A | * | 4/1962  | Holcomb et al. | ....... 328/134 X |
| 3,277,476 | A | * | 10/1966 | Sabin et al.   | ............. 343/5 SA |
| 3,281,527 | A | * | 10/1966 | Davis et al.   | ............ 307/221 X |
| 3,386,077 | A | * | 5/1968  | Molho          | ..................... 343/5 DP |
| 3,388,377 | A | * | 6/1968  | Folsom et al.  | ............ 343/5 DP |
| 3,422,435 | A | * | 1/1969  | Cragon et al.  | ............ 343/5 DP |
| 3,508,212 | A | * | 4/1970  | Ault           | ....................... 307/221 X |
| 3,789,398 | A | * | 1/1974  | Erst           | ............................. 342/128 |
| 3,939,474 | A | * | 2/1976  | Coleman et al. | ............ 342/161 |
| 3,975,729 | A | * | 8/1976  | Ringer         | ......................... 342/82 |
| 4,338,603 | A | * | 7/1982  | Magorian       | ................... 342/189 |

* cited by examiner

Primary Examiner—John B. Sotomayor
(74) Attorney, Agent, or Firm—John J. Karasek; Dorothy I. Becker

(57) ABSTRACT

Circuit for stabilizing the spectral extent of a varying signal containing harmonically related frequency components and having particular utility in the spectral analysis of radar return for the purpose of target identification. The variable signal is written into a storage device at a fixed rate and read out with a variable time compression which is controlled by a discriminator circuit that is connected through a filter to receive one of the harmonic frequency components of the storage device output signal. Also included is signal conversion for digital storage with analog input and output signals.

15 Claims, 3 Drawing Sheets

ADAPTIVE TIME-COMPRESSION STABILIZER

REFERENCE TO RELATED APPLICATION

While having an obviously broad field of utility, the present invention is particularly adaptable to being used with the invention disclosed in U.S. patent application, Ser. No. 05/001,949 filed Dec. 19, 1969 by Robert Hynes.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

As mentioned in the previous paragraph and as the disclosure continues, the reader will recognize (and will occasionally be reminded) that the present invention is useful for many purposes and in many environments. However, for narrative convenience, the invention will be described as functioning to assist in the identification of radar targets by the analysis of the frequency spectrum of reflected radar signals, particularly when processed as disclosed in the related patent application, Ser. No. 05/001,949.

Radar has been intensively developed because it has the ability to detect the presence, velocity, acceleration, range, height, azimuthal direction and direction of movement of a target. The exact nature of the target is, however, usually unknown.

Automatic interrogation and IFF equipment and procedures have been developed that provide an identification of civil airliners and friendly military aircraft. This approach to identifying a radar target is inherently less than completely satisfactory because enemy targets are not identified and because of the possibility of transponder malfunction and of the possibility of the enemy developing the ability to deceptively respond to IFF interrogation.

Because of the very obvious desirability of being able to determine the nature of the radar target from the radar return (ie. the signal caused in the radar receiver by the target) great efforts have been, and are being, made to identify targets from the characteristics of the reflected signal. These reflected signal characteristics are often called the target signature.

In identifying targets by their radar signatures, difficulty is often encountered because of the "smearing" of the spectral signature as a result of component frequency shifting. This shifting is caused by many factors, two of which are particularly troublesome and which can occur because of deliberate radar countermeasures initiated by the enemy pilot.

One radar countermeasure which the enemy pilot may use is to change the radial velocity of his aircraft relative to the radar by maneuvers such as weaving, changing speed, etc. These maneuvers will produce a shifting of the carrier frequency and a frequency translation of much of the spectral signature of the target. The invention disclosed in the related patent application Ser. No. 05/001,949 functions to negate the effectiveness of such a countermeasure by folding the spectral signature about the carrier frequency which is translated to zero frequency.

A second radar countermeasure, which the enemy pilot may use, is to vary the engine speed of his aircraft. Because of the inherent time lag, the change of engine speed and the change of airframe velocity can be considered as being almost independent countermeasures. The effect of changing engine speed is to vary the frequency of harmonically related spectral components which result from the radar reflections from structures, such as engine accessories, compressor rotor discs, propellers, etc. which operate at harmonically related speeds. When, as in the invention of the related patent application, Ser. No. 05/001,949, the effect of varying radial airframe velocity is removed and the target signature is displayed with component lines folded about the carrier frequency translated to DC, the use of the changing engine speed countermeasure results in a smearing of the harmonically related spectral lines.

This type of smearing, ie. where the $n^{th}$ harmonic frequency is shifted n times the fundamental component frequency shift, is soften described in terms of a variation of the spectral extent and in terms of frequency dilation and contraction. Both terms will be used herein.

It should also be mentioned that the same problem of harmonic smearing with variations of the spectral extent is encountered in many simpler environments, such as in a spectral display of a varying frequency sinusoidal signal that includes harmonics.

In efforts to avoid spectral smearing and variations of the spectral extent, prior investigators have resorted to studying very short time samples of the spectral display. This method, while minimizing the effect of frequency variations, has the inherent disadvantage of limiting the spectral resolution and of discarding much information.

SUMMARY OF THE INVENTION

This invention seeks to avoid the disadvantages of prior methods of spectral analysis, particularly in connection with radar signature analysis where smearing of the spectrum display occurs as the result of frequency dilation and contraction, by providing circuitry which stabilizes the spectral extent.

More specifically, the invention provides means which store the radar return signal at a fixed rate and which varies the storage readout rate in such a way that one of the harmonically related components, usually the fundamental frequency component, is kept constant. This is accomplished by controlling the readout speed with a variable frequency clock that is controlled by the output of a discriminator circuit which receives the selected frequency component through a band pass filter. Converters are used to allow digital storage while having input and output signals in analog form.

It is, therefore, an object of the invention to provide improved means for signal analysis.

Another object is to provide a circuit for stabilizing the spectral extent of a signal having harmonically related components by storing the signal at a fixed rate and by varying the time compression or read out rate in such a manner that the frequency of one of the components of the read out signal is kept constant.

Yet another object is to provide a circuit for stabilizing the spectral extent of a signal having harmonially related components by storing the signal at a fixed rate and controlling the time compression or read out rate by a discriminator circuit which is connected to receive a selected frequency component of the read out signal.

A still further object of the invention is to provide an improved circuit for analysing radar return signals having harmonically related components wherein the return signals are stored at a fixed rate in digital form and are read out and converted to analog form at a varying rate that is conrtrolled by a discriminator circuit which is connected to receive a selected one of the harmonically related components of the analog read out signal.

BRIEF DESCRIPTION OF THE DRAWINGS

Other objects, advantages and novel features of the invention will become apparent from the following detailed description of the invention when considered in conjunction with the accompanying drawings wherein.

DESCRIPTION OF PREFERRED EMBODIMENTS

Figure 1:
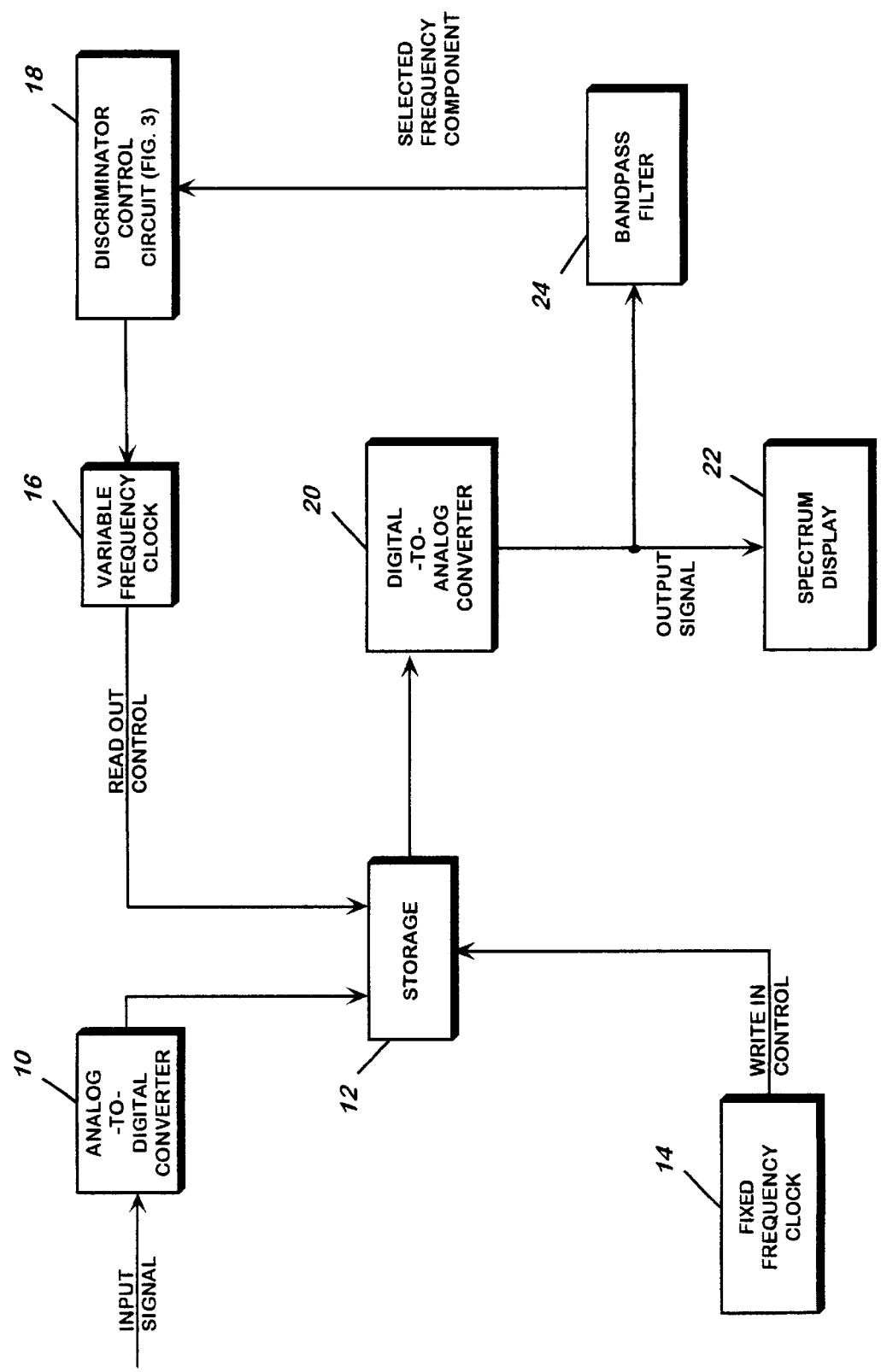
FIG. 1 is a block diagram of the invention.

Reference is now made to the drawings and in particular to FIG. 1 which contains a block diagram of the invention.

The analog input signal, which includes harmonically related components and which is typically the video signal in the receiver of a radar set that has been processed (as by the invention disclosed in the previous patent application, Ser. No. 05/001,949 to remove the effects of carrier frequency variation and to fold the spectrum about the carrier frequency translated to zero, is converted into digital form by converter 10 and sampled and stored at a fixed rate in storage 12 under the control of the fixed frequency clock 14.

Readout from the storage 12, usually at a much faster rate than the storage, is controlled by a variable frequency clock 16 which is in turn controlled by the output of the discriminator control circuit 18. This variable speed digital storage readout is changed into analog form by the converter 20 for use with the display or other spectral analysis device 22. A selected frequency component of the analog output signal of converter 20, typically the fundamental component, is connected to the discriminator control circuit 18 by the bandpass filter 24.

Figure 2:
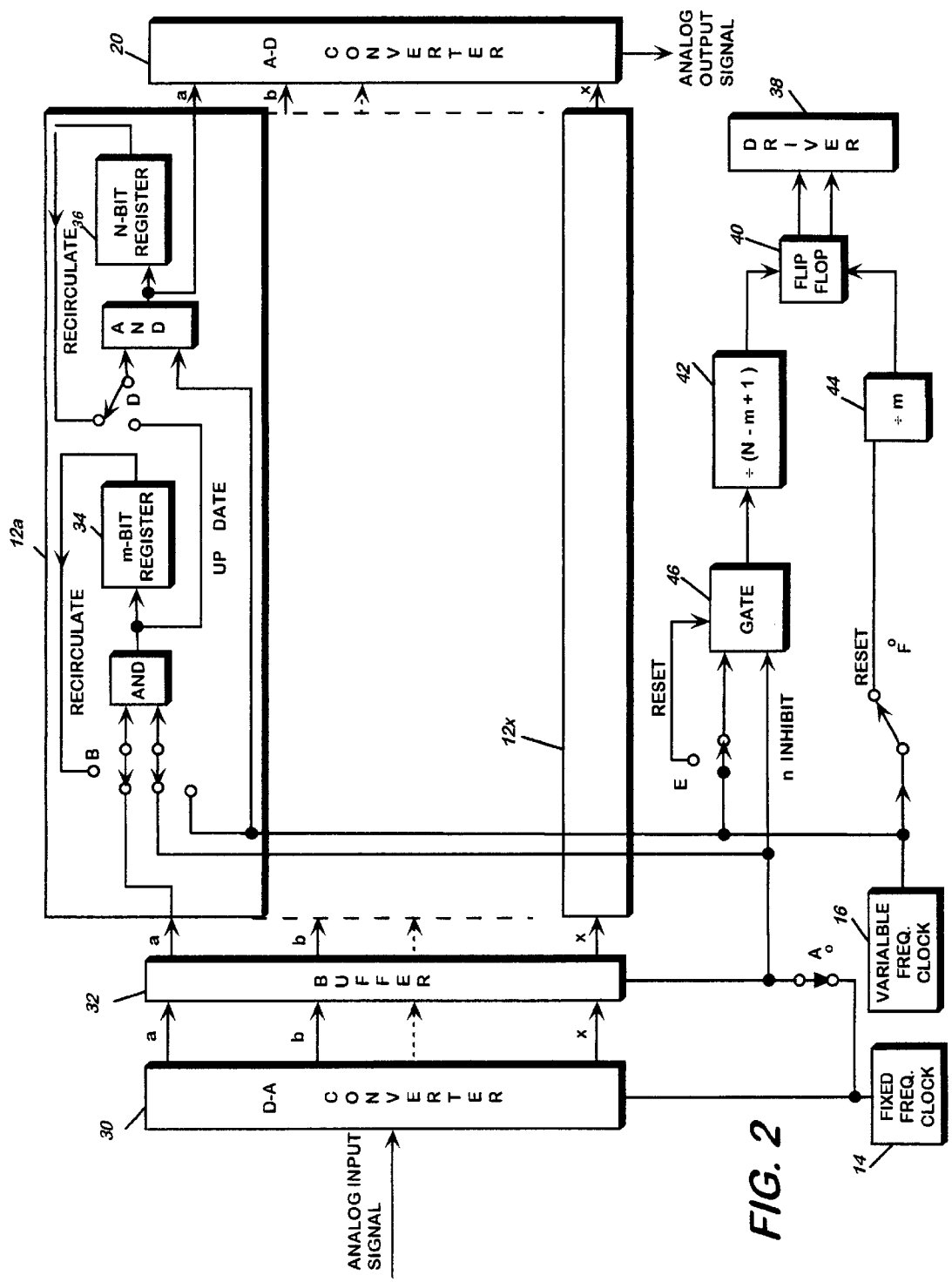
FIG. 2 illustrates the loading, storage and read out portions of the invention in more detail

Referring,now to FIG. 2 which illustrates apparatus that is suitable for use as the loading, storage and readout portions of the invention, ie. components 10, 12, 14, 16 and 20 of FIG. 1. The reader should realize, however, that while shift register apparatus has been shown, other types of apparatus can be used for the storage 12. For example, the storage 12 could be in the form of magnetic tape, capacitor matrix storage, storage tube, magnetic drum, etc. In brief, the storage 12 need only function as a memory that is adaptable to variable time compression, ie. fixed data rate input and variable rate read out, and be adaptable to continual updating of the stored information by replacing the oldest information with the newest information.

In FIG. 2 the analog input signal is applied to a conventional ADC converter 30 that is controlled by clock, 14 and which changes the analog signal into x-bit parallel words at the rate of the fixed frequency clock 14. The x-bit words, which typically would include a sign bit, are transferred through a parallel-in parallel-out buffer 32 into x identical continuously variable time compression storage channels 12a . . . x. Each of these channels include a m-bit update shift register 34 and a N-bit main shift register 36 where n and M typically are 50 and 3000 respectively. The digital outputs of the registers 36 are changed into analog form by conventional DAC 20.

As shown in FIG. 2, the update register 34 is always driven by the clock 14 except during periods when the update register 34 is used to update the main register 36, at which time register 34 is driven by clock 16. As the reader will recall, the frequency of clock 16 is variable and is normally much higher than the frequency of clock 14.

Control of registers 34 and 36 is accomplished by switches B, C and D of the group of switches A–F which are controlled by driver 38 that is in turn controlled by flip-flop 40, (N−m+1) divider 42, (m) divider 44, inhibit gate 46 and switches A, B and F.

It is by now, no doubt, apparent that the operation of FIG. 2 is as follows. The incoming analog signal is converted into a parallel x-bit digital signal (which includes a sign bit) by the converter 30 and buffer 32. This parallel x-bit signal is loaded, at a relatively slow rate controlled by clock 14, into the registers 34 of the storage channels 12a . . . x, where it and other similarly loaded digital signals recirculate until transferred, at the variable high rate of clock 16, to update the data stored in the main recirculating registers 36 which are driven by variable frequency clock 16.

Precession, ie. replacing the oldest data with the newest data, in the registers 36, and the retention in buffer 32 of signals converted during the updating period, is accomplished by the switching A–F which is operated for m pulses of clock 16 (when the switch settings are opposite to that illustrated) spaced by N−m+1+n pulses of clock 16 when the switches are set as shown and where n is the variable number of analog-digital conversions which occur during the data recirculation period in register 36. The recirculating data in the x registers 36 (ie. one in each of the storage channels 12a . . . x) forms the x inputs into converter 20, the output of which is a time compressed, ie. frequency dilated, analog reconstruction of the input signal.

Many circuits which are suitable for use as the discriminator control circuit 18 of FIG. 1 will be readily known to persons skilled in the electronic arts and will include relatively simple frequency locked circuits using frequency discriminators and phase locked circuits using a reference oscillator and a phase detector. All of these circuits will, of course, also require stability circuitry to prevent undesired oscillations.

Figure 3:
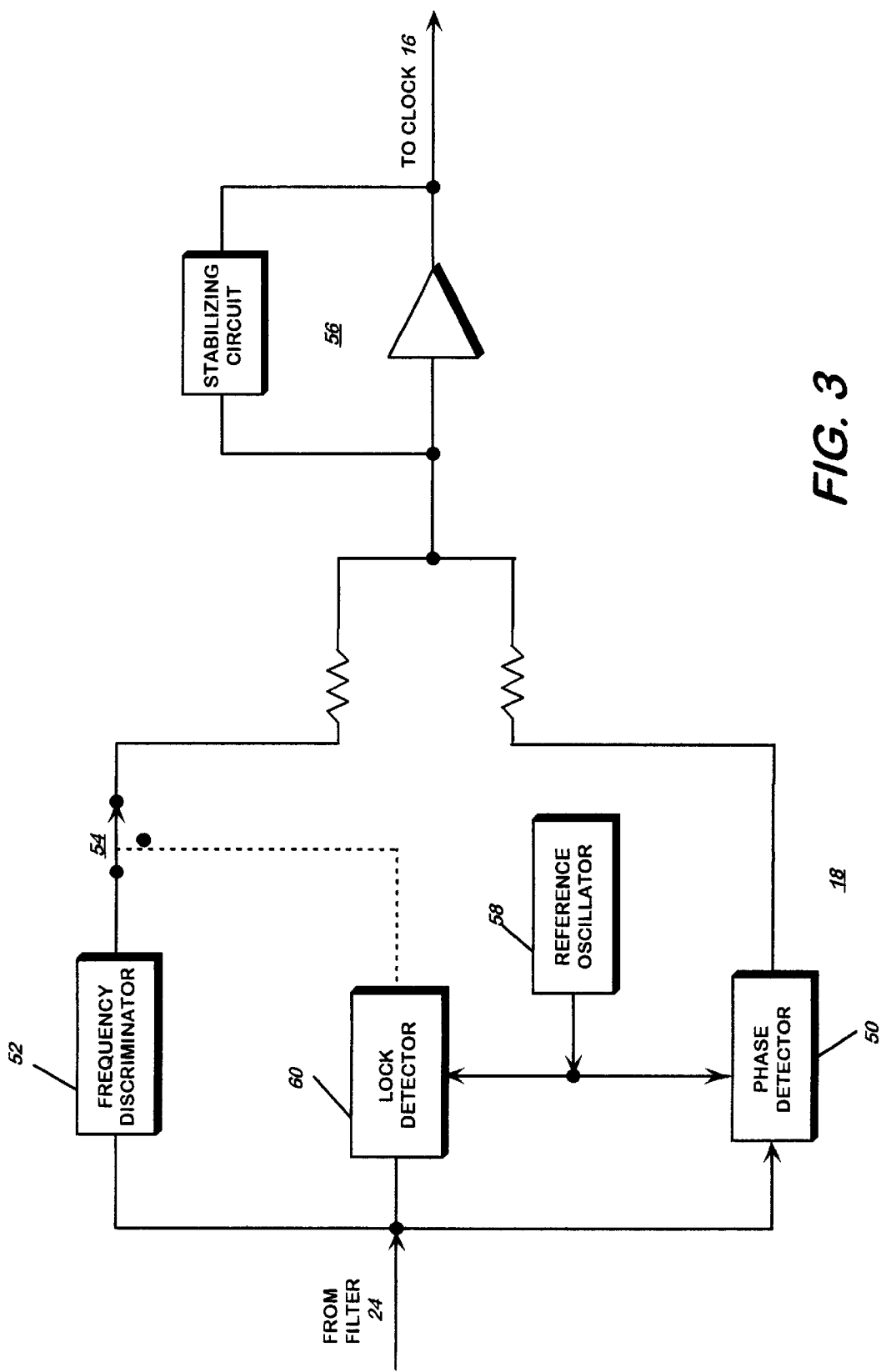
FIG. 3 shows acircuit which is suitable for use as the discriminator control circuit of FIG. 1.

A novel and somewhat more sophisticated circuit which is suitable for use as the component 18 is illustrated in FIG. 3. The signal from bandpass filter 24, which typically is the fundamental line of the harmonically related family that is being extent stabilized, is connected to phase detector 50 and frequency discriminator 52. The discriminator 52 produces asignal which is connected to the variable clock 16 through a switch 54 and an amplifier and stability feedback circuit 56. Discriminator 52 functions to produce an error signal which controls variable frequency clock 16 so that the fundamental is pulled in and locked to the stable reference oscillator 58 which operates at the center frequency of the discriminator 52. The conventional lock detector 60, which is connected to both oscillator 58 and bandpass filter 24, upon sensing the occurrence of a signal lock, produtces a control signal that opens switch 54 and, if desired, energizers a lock indicator that has not been illustrated. Opening of switch 54 causes variable frequency slock 16 to be completely controlled by the phase detector 50 which, of course, compares the signals from filter 24 and oscillator 58 and produces a signal that acts through the amplifying circuitry 56 to control clock 16.

The apparatus of FIG. 3 is advantageous in that it provides the wide, continuous pull in range of the frequency locked loop and precision tracking of the phase locked loop.

There has been disclosed a circuit, particularly useful for the purpose of identifying the radar target by analyzing the frequency spectrum of the radar return, which stabilizes the spectral extent of a signal having harmonically related components wherein the analog signal is stored at a fixed rate in digital form and then read out and converted to analog form at a varying rate that is controlled by a discriminator circuit that is connected to receive a selected harmonic component of the analog read out signal.

More specifically, there has been disclosed an embodiment of the invention, as illustrated in FIGS. 1, 2 and 3, wherein a signal, typically the analog video signal of a radar receiver which has been processed by the invention disclosed in the previous patent application, Ser. No. 05/001, 949 to remove the effects of carrier frequency variation and to fold the spectrum about the carrier frequency translated to zero, is converted into x-bit digital form (where one bit relates to polarity) by the converter 30 and buffer 32 (FIG. 2). There conversions take place at a fixed, relatively slower, rate controlled by clock 14. The x-bit parallel digital words are stored in the parallel time compression storage channels 12a ... x, each of which includes a recirculating update shift register 34 and a recirculating main shift register 36. Switching A–F and controlling components 38, 40, 42, 44 and 46 cause the registers 34 to be driven at the relatively slower rate by clock 14 except when newer information is transferred from register 34 to replace the oldest information stored in the registers 36. During the transfer period both the registers 34 and 36 are driven at the relatively faster rate of variable clock 16.

The x outputs of registers 36 in the channels 12a ... x are converted into analog form by converter 20 and displayed in spectrum form by component 22. The storage readout is at a variable rate and is controlled by the clock 16. Bandpass filter 24 passes a selected component, typically the fundamental harmonic, to the control circuitry of FIG. 3 wherein the error signal of frequency discriminator 52 pulls in the frequency of clock 16 to frequency lock the selected (fundamental) harmonic passed by filter 24 with the signal from reference oscillator 58, whereupon lock detector 60 activates 54 to remove discriminator 52 from control of clock 16, which is then solely controlled by the error signal of phase detector 50.

The described control of the time compression of storage 12, by varying the frequency of clock 16 to stabilize the extent of the spectrum displayed at component 22, allows a prolonged study of the spectrum, without the usual undesirable smearing, and thereby provides a greatly improved possibility of identifying the radar target.

Obviously many modifications and variations of the present invention are possible in the light of the above teachings. It is therefore to be understood that within the scope of the appended claims, the invention may be practiced otherwise than as specifically described.

What is claimed and desired to be secured by Letters Patent of the United States is:

1. Circuit for stabilizing the spectral extent of a varying signal containing harmonically related frequency components comprising:

storage means connected to receive said varying signal and functioning to store said varying signal at a fixed rate;

variable rate readout means connected to said storage means and functioning to produce a time compressed signal that has a variable time compression relationship to said varying signal;

filtering means connected to receive said time compressed signal and functioning to pass only a selected frequency component of said time compressed signal and control means connected to receive said selected frequency component and producing an error signal that is connected to control said variable rate readout means and which is related to the deviation of said selected frequency component from a reference frequency, whereby the spectrum extent of said time compressed signal is stabilized.

2. The circuit of claim 1 wherein said storage means includes an analog-to-digital converter controlled by a fixed frequency clock and said variable rate readout means includes a digital-to-analog converter controlled by a variable frequency clock which is connected to receive said error signal.

3. The circuit of claim 2 wherein said storage means further includes precession means which function to replace older stored varying signals with newer varying signals.

4. The circuit of claim 1 wherein said control means includes:

a reference oscillator;

a frequency discriminator connected to receive said selected frequency component;

frequency comparison means connected to said reference oscillator and to receive said selected frequency component and functioning to incapacitate said frequency discriminator when the frequency of said reference oscillatoris the same as said selected frequency component and phase comparison means connected to said reference oscillator and to receive said selected frequency component and functioning to produce an error signal related to the phase difference between the signal produced by said reference oscillator and the selected frequency component.

5. The circuit of claim 4 wherein said storage means includes an analog-to-digital converter controlled by a fixed frequency clock and said variable rate readout means includes a digital-to-analog converter controlled by a variable frequency clock which is connected to receive said error signal.

6. The circuit of claim 5 wherein said storage means further includes precession means which function to replace older stored varying signals with newer varying signals.

7. In a radar system, a circuit which improves the frequency spectrum display of a signal derived from the radar return and which is particularly useful derived from the radar return identification by spectrum analysis, said circuit comprising:

storage means connected to receive said derived signal and functioning to store said derived signal at a fixed rate;

variable rate readout means connected to said storage means and functioning to produce a time compressed signal that has a variable time compression relationship to said derived signal;

a spectrum display device connected to receive said time compressed signal;

filtering means connected to receive said time compressed signal and functioning to pass only a selected frequency component of said time compressed signal and control means connected to receive said selected frequency component and producing an error signal that is connected to control said viaiable rate readout means and which is related to the deviation of said selected frequency component from a reference frequency.

8. The circuit of claim 7 wherein said storage means includes an analog-to-digital converter controlled by a fixed frequency clock and said variable rate readout means includes a digital-to-analog converter controlled by a variable frequency clock which is connected to receive said error signal.

9. The circuit of claim 8 wherein said storage means further includes precession means which function to replace older stored derived signals with newer derived signals.

10. The circuit of claim 7 wherein said control means includes:
   a reference oscillator;
   a frequency discriminator connected to receive said selected freqluency component;
   frequency comparison means connected to said reference oscillator and to receive said selected frequency component and functioning to incapacitate said frequency discriminator when the frequency of said reference oscillator is the same as said selected frequency component and
   phase comparison means connected to said reference oscillator and to receive said selected frequency component and functioning to produce an error signal related to the phase difference between the signal produced by said reference oscillator and the selected frequency component.

11. The circuit of claim 10 wherein said storage means includes an analog-to-digital converter controlled by a fixed frequency clock and said variable rated readout means includes a digital-to-analog converter controlled by a variable frequency clock which is connected to receive said error signal.

12. The circuit of claim 11 wherein said storage means further includes precession means which function to replace older stored derived signals with newer derived signals.

13. Apparatus for locking a variable input signal with a reference signal comprising:
   frequency discriminator means connected to receive said variable input signal and functioning to produce a frequency error signal related to the frequency difference between said variable input signal and said reference signal;
   frequency comparison means connected to receive said variable input signal and said reference signal and functioning,to incapacitate said frequency discriminator means when the frequency of said variable input signal is the same as the frequency of said reference signals;
   phase comparison means connected to receive said variable input signal and said reference signal and functioning to produce a phase error signal related to the phase difference between said variable input signal and said reference signal and
   control means connected to receive said frequency error signal and said phase error signal and functioning to vary the frequency of said variable input signal in a manner which causes said frequency and phase error signals to become zero.

14. Variable time compression signal storage apparatus comprising:
   fixed rate conversion means connected to receive an input signal and functioning to convert said input signal at a fixed rate into digital signals in the form of a plurality of x-bit parallel input signals;
   storage means having x parallel channels connected to receive said x-bit parallel input signals and to produce at a variable rate x-bit digital parallel output signals;
   variable frequency control means connected to said storage means and functioning to control the variable rate of production of said x-bit digital parallel output signals and
   digital-to-analog conversion means connected to receive said x-bit digital parallel output signal sand functioning to produce an analog output signal having a variable time compression relationship with said input signal.

15. Variable time compression signal storage apparatus as set forth in claim 14 wherein each of said x parallel channels includes;
   a m-bit recirculating shift register;
   a N-bit recirculating shift register connected to be driven at said variable frequency and
   switching means controlled by said variable frequency control means to be alternately in a first position for N−m+1+n cycles of said variable frequency and to be subsequentially in a second position for m cycles of said variable frequency and to repetitively alternate between said first and second positions, and functioning when in said first position to connect said m-bit register to be driven and loaded with input signals at a fixed rate and when in said second position to connect said m-bit register to said N-bit register and to be driven at said variable frequency, where n is the number of x-bit digital signals converted while said switching means is in said first position.

* * * * *